Dec. 13, 1955 R. C. JAYE 2,727,128
DEVICE FOR CUTTING APERTURES IN CELLULAR THERMOPLASTIC
Filed Nov. 10, 1953
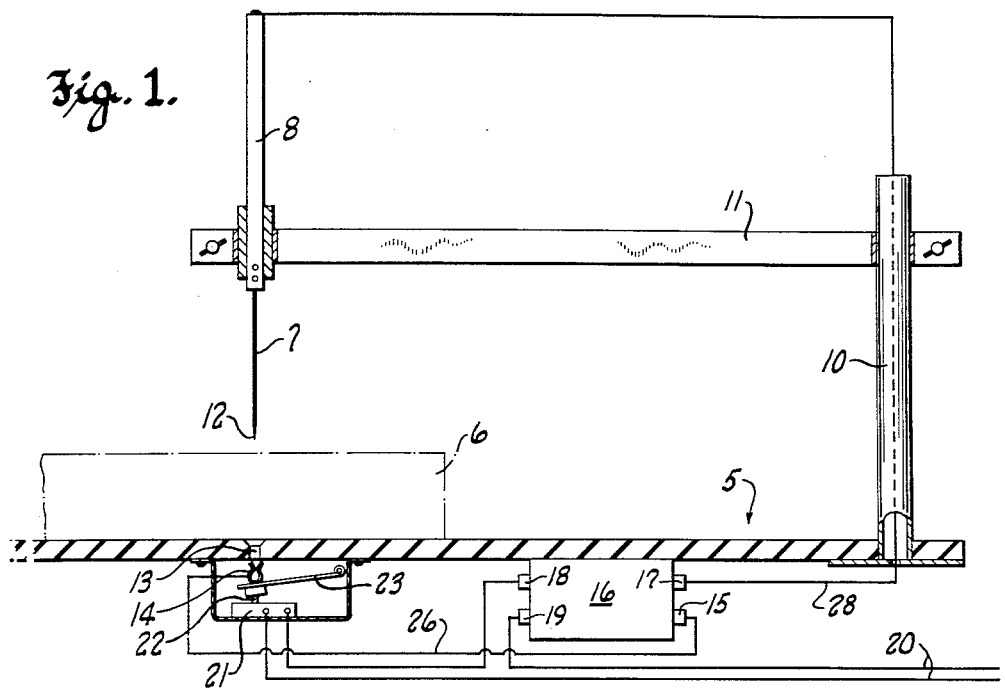
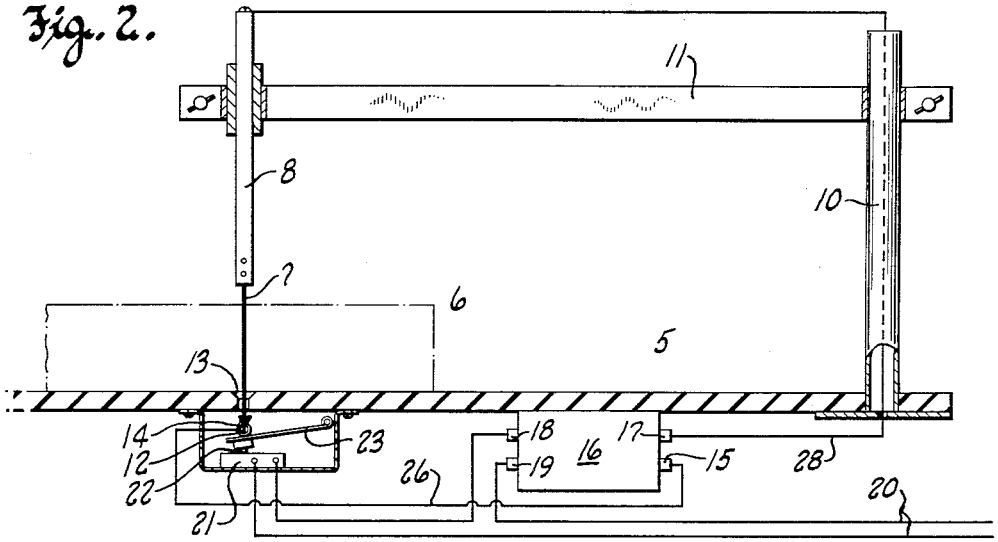
Inventor
Richard C. Jaye
By Ira Milton Jones
Attorney

United States Patent Office 2,727,128
Patented Dec. 13, 1955

2,727,128

DEVICE FOR CUTTING APERTURES IN CELLULAR THERMOPLASTIC

Richard C. Jaye, Watertown, Wis., assignor to The Jaye Corporation, Watertown, Wis., a corporation of Wisconsin Application November 10, 1953, Serial No. 391,180

2 Claims. (Cl. 219—19)

This invention relates to apparatus for cutting cellular thermoplastic material such as Styrofoam and the like and refers more particularly to a device for cutting apertures through slabs of such material.

Cellular thermoplastic material in the nature of Styrofoam and similar substances is finding increasing use in advertising displays, signs and the like, both because of its attractive "frosty" appearance and because of its very light weight coupled with relatively high strength. In fabricating articles from Styrofoam it is frequently necessary to cut a piece out of the medial portion of a plate or slab of the material in order to make an aperture through the slab. To start the cut by which the aperture is formed a cutting element must somehow be introduced into the medial portion of the slab, but if this is done by cutting inwardly from one side of the slab a slit is left in the finished article which opens to the aperture and to one edge of the slab. In most cases such a slit is extremely undesirable, and hence the cutting element should be introduced directly into that portion of the slab which is intended to be cut away to form the aperture.

The present invention has for its object the provision of apparatus whereby an aperture of any desired size or shape may be readily cut through a slab or plate of cellular thermoplastic material such as Styrofoam or the like without leaving a starting slit in the finished article.

More particularly it is an object of this invention to provide a device for cutting apertures in slabs of Styrofoam and the like by means of a thin rod which is heated by the passage of an electric current therethrough and which cuts the material by melting the same as the material is moved past the rod.

Another and very important object of this invention resides in the provision of an inexpensive device for cutting apertures in slabs of Styrofoam and the like by means of an electrically heated rod-like cutter, which device is characterized by an important safety feature whereby the flow of current through the cutter is automatically shut off upon retraction of the cutter from the work and remains off until the cutter is again brought into operative position.

With the above and other objects in view, which will appear as the description proceeds, this invention resides in the novel features substantially as hereinafter described and more particularly defined by the appended claims, it being understood that such changes in the precise embodiment of the herein disclosed invention may be made as come within the scope of the claims.

The accompanying drawing illustrates one complete example of the physical embodiment of the invention constructed according to the best mode so far devised for the practical application of the principles thereof, and in which:

Figure 1 is a side view, partially in section, of a device embodying the principles of this invention, shown in its inoperative position; and Figure 2 is a view similar to Figure 1, but showing the device in its operative position.

Referring now more particularly to the accompanying drawing, the device of this invention comprises, in general, a table 5 having a flat top or working surface on which a slab 6 of Styrofoam or the like may rest and across which it may be moved to have an aperture cut therein by means of a rod-like cutter 7. The cutter is secured to an elongated holder 8, in end-to-end alignment with the holder and projecting downwardly therefrom, and the holder is in turn mounted for endwise up and down motion on a rigid support comprising a post 10 projecting upwardly from the table near one edge thereof and an arm 11 extending laterally from the post, across the table and spaced above the top thereof, the holder 8 being mounted in the end portion of the arm remote from the post.

The supporting arm is preferably secured to the post in such a manner as to be adjustable along the height of the post, and has a length sufficient to provide a throat of substantial depth between the cutter and the post. Since the material to be acted upon must be moved past the cutter, a deep throat between the cutter and the post is necessary to enable the device to accommodate relatively large slabs of material.

The cutter is made of resistance material, such as Nichrome, which will heat when an electric current is passed therethrough, and it is slender enough so that it will cut a relatively thin channel through a piece of cellular thermoplastic material moved past it, but is heavy enough to be fairly rigid. Preferably the cutter is provided with a sharp point 12 at its lower end since it is intended that before the cutter is heated it will be forcibly pushed through the slab of material to be worked, in the portion of the slab intended to be cut away to form the aperture. It will be appreciated that because of the softness of cellular thermoplastic only a relatively small force will be required to drive the cold needle-like cutter through even a fairly thick slab of such material, and the holder 8 in which the cutter is mounted serves as a handle to facilitate this piercing operation and enable it to be performed manually. Since the holder is also grasped in raising the cutter to permit removal of the finished article from the machine, the holder is preferably made of material having good electrical and heat insulative properties.

The table has a hole 13 therethrough, in line with the cutter so that when the cutter is pierced through a slab of material, its lower end portion may project through a metal socket 14 mounted beneath the table. Engagement of the lower end portion of the cutter in this socket completes an electric circuit through the cutter, since the socket is connected with one secondary terminal 15 of a transformer 16, while the cutter is directly connected at its upper end with the other secondary terminal 17 of the transformer, the primary terminals 18 and 19 of the transformer being connected with alternating current supply mains 20.

It will be observed that the flow of current through the cutter will be interrupted as soon as the cutter is raised out of engagement with the socket, and since it is necessary to lift the bottom of the cutter above the top of a slab being cut in order to withdraw the slab from the device without leaving a slit in the finished article, the machine is automatically shut off upon completion of a cut and withdrawal of the cutter, and remains off as long as the machine is not in actual use.

To prevent arcing between the lower end of the cutter and the socket when the cutter is withdrawn from the socket, a switch 21 mounted under the table disconnects the transformer primary circuit from the current source simultaneously with raising of the cutter. The switch has a push button 22 or other reciprocable actuating member and is normally biased to its "off" position. The socket is mounted on an arm 23 which is freely pivoted for up and down swinging motion and which bears upon the push button so that when the cutter is pushed down through a slab of material and into the socket, the push button will be actuated against its bias to its "switch on" position.

The switch is connected in such a manner as to interrupt one side of the current supply provided by the mains 20, and since the switch is normally open, current does not ordinarily flow to the primary terminals of the transformer. Upon closure of the switch when the cutter is pierced through a slab of Styrofoam, current may flow to the socket from the secondary terminal 15 of the transformer by way of a conductor 26, and from the other secondary terminal 17 to the upper end of the heating element by way of a conductor 28. Preferably the transformer is mounted beneath the table and the conductor 28 extends upwardly through the post, which is hollow to accommodate it.

From the foregoing description, taken together with the accompanying drawing, it will be apparent that this invention provides a very simple and inexpensive apparatus for cutting medial apertures in slabs of cellular thermoplastic material, which device incorporates an important safety feature in that no current can flow through the electrically heated cutter at times when the device is not in actual operation.

What I claim as my invention is:

1. Apparatus for cutting apertures through slabs of cellular thermoplastic material, comprising: a table having a hole therethrough and having a flat top surface; a substantially rigid rod-like cutter of resistance material; stationary supporting means spaced above the table top; means endwise slidably mounting the cutter on said supporting means for up and down movement in alignment with said hole in the table, between a lowermost position in which its lower end portion extends through the hole and an uppermost position in which its lower end is spaced above the table top; a conductive socket beneath the table, in alignment with said hole, in which the lower end portion of the cutter is engaged when in its lowermost position; a switch having an actuating member movable to switch on and switch off positions, said switch being normally biased to its switch off position; means for actuating the switch actuating member to switch on position upon lowering of the cutter into engagement with the socket; a pair of power supply terminals connectible with a source of electric current by closure of said switch so that upon closure of the switch said terminals are "live"; and conductor means connecting the upper end portion of the cutter with one of said power supply terminals and said conductive socket with the other terminal, so that current flow is established through the cutter when it is engaged with said socket and is interrupted when the cutter is raised out of the socket.

2. Apparatus for cutting apertures through slabs of cellular thermoplastic material, comprising: a table having a flat top surface upon which a slab of cellular thermoplastic is adapted to rest, said table having a hole therethrough; an elongated holder; a stationary support mounted above the table, spaced from the top surface thereof, and in which said holder is endwise slidably mounted for up and down movement in alignment with the hole in the table; a substantially rigid rod-like cutter of resistance material extending downwardly from said holder, in alignment therewith, and constrained to up and down movement with the holder to have its lower end portion extending through said hole in the table when the holder is in its lowermost position and spaced above the table when the holder is raised to an elevated position; an electric switch having an actuating member movable to switch-on and switch-off positions and normally biased to switch-off position; an upwardly opening conductive socket beneath the table, mounted for up and down movement in alignment with the hole in the table and in which the lower end portion of the cutter is engageable when in its lowermost position, said socket being connected with said actuating member of the switch to move the same to its switch-on position upon downward movement of the socket due to engagement thereof by the cutter; and conductor means connecting the top of the cutter with one terminal of a source of electric current and said socket with the other terminal, so that current flows through the cutter to heat the same when the cutter is moved to its lowermost position and engaged with the socket, but such flow of current is automatically interrupted when the cutter is raised.

References Cited in the file of this patent

UNITED STATES PATENTS

| | | |
|---|---|---|
| 2,248,057 | Bond | July 8, 1941 |
| 2,386,168 | Pattberg | Oct. 2, 1945 |
| 2,477,040 | Brown et al. | July 26, 1949 |
| 2,510,383 | Dalgleish | June 6, 1950 |
| 2,516,609 | Woodward | July 25, 1950 |
| 2,607,872 | Enabit | Aug. 19, 1952 |